(12) United States Patent
Cicotte

(10) Patent No.: US 6,279,425 B1
(45) Date of Patent: Aug. 28, 2001

(54) METHOD OF PRODUCING TOOLS AND DIES

(76) Inventor: Edmond Burton Cicotte, 11086 Hedgeway, Utica, MI (US) 48317

( * ) Notice: Subject to any disclaimer, the term of this patent is extended or adjusted under 35 U.S.C. 154(b) by 0 days.

(21) Appl. No.: 09/438,832

(22) Filed: Nov. 12, 1999

(51) Int. Cl.⁷ .................................................. B21K 5/20
(52) U.S. Cl. ........................................ 76/107.1; 72/709
(58) Field of Search ............................. 76/107.1; 72/709

(56) References Cited

U.S. PATENT DOCUMENTS

| | | |
|---|---|---|
| 2,735,390 | 2/1956 | Engel . |
| 3,343,430 * | 9/1967 | Haas et al. ........................... 76/107.1 |
| 3,463,035 | 8/1969 | Bright . |
| 3,705,509 | 12/1972 | Haller . |
| 3,934,440 | 1/1976 | Berg . |
| 4,088,046 | 5/1978 | Severinsson . |
| 4,424,727 | 1/1984 | Mader . |
| 4,936,128 | 6/1990 | Story et al. . |
| 5,085,068 | 2/1992 | Rhoades et al. . |
| 5,223,051 | 6/1993 | Ryntz, Jr. . |
| 5,337,631 | 8/1994 | Singer et al. . |
| 5,638,724 | 6/1997 | Sanders . |

* cited by examiner

Primary Examiner—Douglas D. Watts
(74) Attorney, Agent, or Firm—Vanophem & Vanophem, P.C.

(57) ABSTRACT

A method of producing a tool or die from a model that includes producing a rigid mold from the model, forming a die shell of the model from a sheet of material in close conforming relationship over the rigid mold, and applying a reinforcing substrate to the die shell on a side of the die shell opposite that of the rigid mold. The applying step is performed while the die shell is still in close conforming relationship with the rigid mold, thereby forming the tool or die from the reinforcing substrate and die shell.

44 Claims, 2 Drawing Sheets

METHOD OF PRODUCING TOOLS AND DIES

BACKGROUND OF THE INVENTION

1. Field of the Invention

The present invention generally relates to a method of making tools and dies for producing a series of articles. More specifically, this invention relates to a method of making die shells from a model of predetermined dimensions, where the die shells are ultimately used for stamping, casting, molding, or forging a high volume of identical parts.

2. Description of the Prior Art

For many decades, forming dies have been used to produce various large high-volume parts for automobiles—including automobile fenders, hoods, doors, and interior panels for example. These parts often involve very tight tolerances and "Class-A" surfaces that demand use of precision dies. Class-A surfaces are those with which an automobile operator interacts, such as the outer surface of a hood or a door panel. Traditional precision dies are typically heavy, large metal bodies that are machined from blank stock, or cast to rough shape and then machine finished. Traditional dies demand a costly and time-consuming amount of precision machining of the entire die to achieve the tight final part tolerances.

Such dies are expensive for several reasons, but primarily because the dies are made of relatively expensive material and the traditional die making process requires use of a large volume of this material, much of which is wasted when machined away. In addition, the machining process requires use of large and expensive machining centers, expensive perishable tools, and substantial amounts of expensive time to finish the die. Some die designs also require use of equally costly and time-consuming hardening and finishing processes. Therefore, alternatives to the manufacture of traditional dies has been suggested over the years.

For example, in U.S. Pat. No. 3,463,035 to Bright there is disclosed a method of preparing die plates addressing the problem of cost prohibitive and time-consuming traditional dies. Bright teaches fabricating die plates by: providing a positive impression from a model; forming a coating of wax equal in thickness to the finished die plate over the positive impression; casting an undersized negative impression of hardenable material from the wax coated positive impression; explosion forming three sheets of die plate metal over the negative impression to conform therewith; and reinforcing the top and bottom die plates with an epoxy resin.

Unfortunately, this technology has many disadvantages. First, using a coating of wax to compensate for the finished part thickness is unreliable, since wax coating involves an intolerable amount of variation in thickness. Second, using a process that utilizes a hardenable material like epoxy resin, as Bright suggests, may be insufficient to withstand extremely high forming forces or processes that use high temperature forming techniques. Third, explosion forming can be dangerous and requires use of extremely robust and expensive equipment, and obviously a rather extraordinary degree of care. Fourth, the die plates must be removed from a negative impression before being reinforced by a substrate backing. This removal step will tend to distort the die plates thereby resulting in compromised die quality. Distortion may be minimized by sizing the die plates to withstand the forces incurred during the removal step. This, however, only increases the weight, expense, and time to make the dies.

A fifth disadvantage of the Bright reference is that the forming surfaces of each die plate are not produced directly off the corresponding forming surface of the mold, from which each die plate is made. Instead, the forming surfaces of each die plate are produced from opposite sides of a slave sheet of metal that is sandwiched between the die plates during the die forming process. This results in an inferior forming surface on the die plate since it is not a direct descendant of the "master" surface of the model. The forming surface of the mold is also not produced directly off the master surface of the preceding pattern or model. Instead, the forming surface of the mold is produced by an outer surface of a wax layer that is intermediate the mold and a preceding pattern or negative impression. Therefore, the forming surfaces of each die of the Bright reference cannot be traced directly back to the model master surface. It can only be said they trace indirectly back through the medium of a wax layer and a slave sheet, to the model master surface. Furthermore, the forming surface of each die plate is at least four steps removed from the model master surface.

In another example, U.S. Pat. No. 4,088,046 to Severinsson, there is disclosed a method of producing forming tools addressing the problems of die deformation from prior art die preparation. Severinsson teaches fabrication of a mould shell forming tool by: providing a master pattern; thermal spraying a soft first layer of metal on either side of the master pattern; thermal spraying a harder second layer of metal over the first layer; and bonding a support material to the back sides of the mould shells. Likewise, U.S. Pat. No. 5,337,631 to Singer et al., teaches a similar method of producing tools and dies. Singer et al. teach fabrication of a die by providing a pattern, electroforming the die by electroplating the surfaces of the pattern to form a shell, then filling the shell by thermal spraying or peening. Thermal spraying can be relatively inaccurate due to variations in thickness stemming from operator inattention. Therefore, the Singer et al. process requires extraordinarily sophisticated metal deposition technology that tends to be relatively expensive and requires specialized expertise.

From the above, one can see several attempts that were made over the years to replace the inefficient, expensive, and time-consuming traditional methods of machining or casting dies. What is needed, therefore, is a novel method for producing accurate dies that is solid-state, less expensive, able to withstand severe press forces, and automatically compensates for actual part thickness.

SUMMARY OF THE INVENTION

A novel method is provided for producing accurate dies that is less expensive, able to withstand severe press forces, automatically compensates for actual part thickness, and results in die forming surfaces that directly descend from a model master surface. Accordingly, the present invention involves a method of producing a tool or die from a model that includes producing a rigid mold from the model, forming a die shell of the model from a sheet of material in close conforming relationship over the rigid mold, and applying a reinforcing substrate to the die shell on a side of the die shell opposite that of the rigid mold. The applying step is performed while the die shell is still in close conforming relationship with the rigid mold, thereby forming the tool or die from the reinforcing substrate and die shell.

Accordingly, it is an object of the present invention to produce a die shell having forming surfaces that directly descend from a master surface on a model or pattern.

It is another object to produce a die shell where thickness of a final part or thickness of a die plate is automatically compensated for in the method.

It is yet another object to provide a die shell that is able to withstand press forces necessary to form large stampings for such parts as automobile body panels.

These objects and other features, aspects, and advantages of this invention will be more apparent after a reading of the following detailed description, appended claims, and accompanying drawings.

DETAILED DESCRIPTION OF THE PREFERRED EMBODIMENT

In general, a method of producing a tool or die for producing a series of articles is described in detail. While the method of the present invention will be described in detail with respect to producing dies, the invention is also well suited to producing tools. Furthermore, the term "model" is defined as a three-dimensional representation of an object to be replicated into a series of articles. A model has a "master" surface from which corresponding "copy" surfaces on a pattern, mold, die, or individual article directly descend. For patterns, molds, dies, or individual articles composed of sheet stock, there is a "following" surface that is opposite each copy surface. A following surface is distinct from a copy surface in that it does not directly descend from the master surface of the model. Rather, a following surface is incident to its corresponding copy surface and, therefore, indirectly descends from the master surface of the model.

In addition, the term "pattern" means an object that is an imitation of a model. The phrase "positive pattern" pattern means a surface-by-surface imitation of the model, sometimes referred to as a "male" pattern. Further, the phrase "negative pattern" means an inverse imitation of the model, sometimes referred to as a "female" pattern. The term "mold" means an impression of a model or pattern, where the mold is used to form a duplicate of the model or pattern. The phrase "positive mold" means a surface-by-surface imitation of the model or pattern, sometimes referred to as a "male" mold. The phrase "negative mold" means an inverse imitation of the model or pattern, sometimes referred to as a "female" mold.

Figure 1:
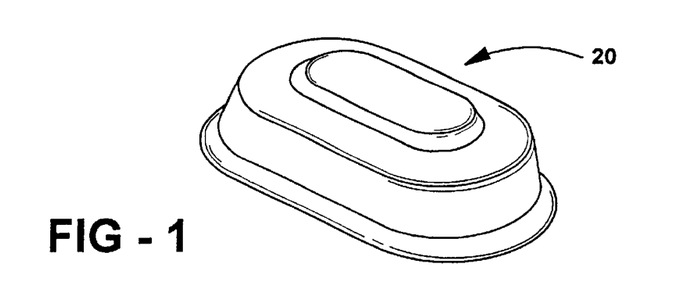
FIG. 1 is a perspective view of a model from which dies and body panels will be replicated.

Referring specifically now to FIG. 1, a model 20 of a body panel is used to illustrate the method of producing a die shell and die. Generally, the die of the present invention may be used in the forming of materials within a very broad range, including the plastics molding industry. Specifically, the die is intended for replicating a high volume of body panels. The model 20 of FIG. 1 is essentially a "master" for the method of the present invention. The model 20 may include an actual physical model such as a clay sculpture, or even a previously manufactured body panel. Alternatively, the model 20 may be composed of a digital data set, such as a three-dimensional CAD rendering or a list of digital data points.

The first step of the present invention includes producing a rigid mold from the model 20 of FIG. 1. In the preferred embodiment of the present invention the first step is performed by surface mapping the model's contours by any of a number of methods as is known in the art, such as CNC probing, digital imaging, or the like. Where the model is originally in digital form, however, surface mapping simply involves data acquisition from the digital data set. The surface map data is then stored digitally from which a pattern or mold may be later fabricated. Further, the surface map data is digitally manipulated to undersize or oversize the subsequent pattern or mold, if necessary. Digitally manipulating the surface map data may be desirable to undersize or oversize the pattern or mold either by the thickness of each of the body panels to be fabricated thereby or by the thickness of the die shell, as will be discussed further below.

Figure 2:
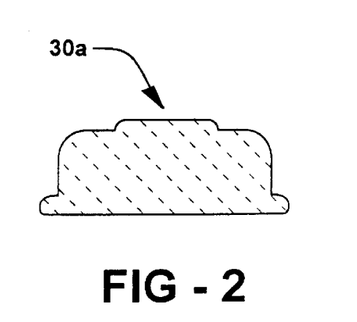
FIG. 2 is a cross-sectional view of a positive rigid mold of the model of FIG. 1 and represents the first step of the method of the present invention.
Figure 3:
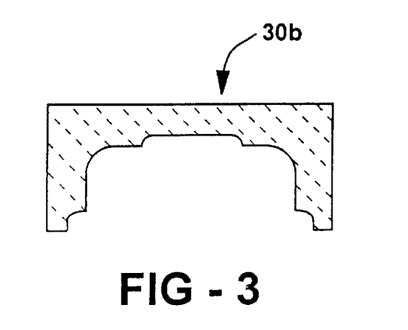
FIG. 3 is a cross-sectional view of a negative rigid mold of the model of FIG. 1 and represents the first step of the method of the present invention.
Figure 10:
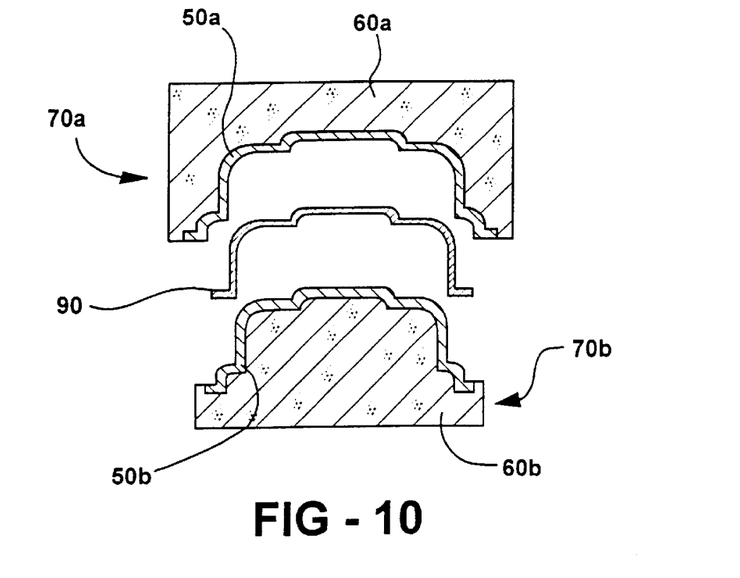
FIG. 10 is an exploded cross-sectional view of a negative and positive die setup with a finished panel therebetween.

Continuing with the preferred embodiment of the first step of the present invention, the rigid mold is machined by a computer controlled machining center using the surface map data downloaded from a computer used in the surface mapping step discussed above. The rigid mold is preferably machined from a ceramic blank but may be machined from any suitable material such as a composite, cast iron, Kirksite, or various refractory materials. FIGS. 2 and 3 illustrate a positive rigid mold 30a and negative rigid mold 30b respectively. The positive rigid mold 30a is machined using the surface map data from above. The negative rigid mold 30b, however, is machined using the surface map data that has been manipulated to compensate for the desired thickness of a final body panel 90 as shown in FIG. 10. In addition, the surface map data may be further manipulated to add a base to the positive and negative rigid molds 30a and 30b, if desired.

Alternatively, the positive and negative rigid molds 30a and 30b may be made by any other appropriate mold making means. For example, in one embodiment of the first step of the present invention, the positive rigid mold 30a is formed via a mold taken directly from the model 20 of FIG. 1. This is accomplished by first casting a solidifying material, such as plaster or rubber, over the model to form a negative soft mold, and second filling the negative soft mold with a hardenable material such as ceramic to form the positive rigid mold 30*a*. Similarly, the negative rigid mold 30*b* is formed by: first, machining a layer off the model by a thickness equal to the desired thickness of the final body panel; and second, casting a hardenable material over the model to form the negative rigid mold, such as by the "Unicast" process. With the Unicast process, blended ceramic particles are rapidly mixed with a liquid binding agent to form a free-flowing ceramic slurry. The ceramic slurry is then poured rapidly over a model or pattern. The ceramic slurry sets very quickly to form a ceramic mold with favorable strength characteristics. The ceramic mold is then stripped from the model or pattern and cured at approximately 1800° F. for suitable casting properties.

In another alternative embodiment of the first step of the present invention, the positive rigid mold 30*a* is formed via molds taken from a pattern of the model. This is accomplished by: first, surface mapping the model to generate surface map data; second, downloading the surface map data to a machine tool that machines the positive pattern; third, casting a solidifying material, such as fiberglass or rubber, over the positive pattern to form a negative soft mold; and fourth, pouring a hardenable material into the negative soft mold to form the positive rigid mold 30*a*. Similarly, the negative rigid mold 30*b* is formed by: first, surface mapping the model to generate surface map data; second, manipulating the surface map data to compensate for the desired thickness of each of the final body panels; third, downloading the manipulated surface map data to the machine tool to machine a negative pattern; fourth, casting a solidifying material over the negative pattern to form a positive soft mold; and fifth, pouring a hardenable material over the positive soft mold to yield the negative rigid mold 30*b*.

In still another alternative embodiment of the first step of the present invention, the positive and negative rigid molds 30*a* and 30*b* are formed via investment casting. This is accomplished by: first, surface mapping the model to generate surface map data; second, using the surface map data to make a negative expendable pattern from foam, wax, or some polymer conducive to investment casting; third, coating the negative expendable pattern with a series of ceramic slurry layers, thus forming a positive ceramic shell; and fourth, firing the negative expendable pattern and positive ceramic shell in a furnace to cure the positive ceramic shell and vaporize the expendable pattern, thus leaving the positive rigid mold 30*a*. The negative rigid mold 30*b* is also produced by: first, surface mapping the model to generate surface map data; second, manipulating the surface map data to make an undersized positive expendable pattern; third, coating the undersized positive expendable pattern with a series of ceramic slurry layers to form a negative ceramic shell; and fourth, firing the undersized positive expendable pattern and negative ceramic shell to cure the negative ceramic shell and vaporize the undersized positive expendable pattern.

In yet another alternative embodiment of the first step of the present invention, the positive and negative rigid molds 30*a* and 30*b* are formed via prototype layered models. This is accomplished by: first, surface mapping the model to generate surface map data; second, downloading the surface map data to digital prototyping equipment that generates a negative prototype mold—layer by layer—such as by stereolithography or similar prototyping technology as is well known in the art; and third, introducing a ceramic, for example, to the negative prototype mold to form the positive rigid mold. Similarly, the surface map data can be manipulated to make an undersized positive prototype mold. Ceramic is then introduced to the positive prototype mold to form the negative rigid mold.

In a final alternative embodiment of the first step of the present invention, the positive and negative rigid molds 30*a* and 30*b* are formed via expendable pattern casting. This is accomplished by: first, surface mapping the model; second, downloading the surface map data to a machine tool to machine a positive pattern from blank stock, such as foam, plaster, etc; and third, expendable casting the positive rigid mold from the positive pattern. This third step is performed by an expendable pattern casting process, such as by lost-foam casting the molds from patterns. Accordingly, the pattern is set in a flask suspended in unbonded sand. The flask is vibrated to compact the sand during filling of the flask. Then molten material is poured into the flask thereby vaporizing the pattern and allowing the molten material to fill the mold cavity. Forming the negative rigid mold 30*b* includes another sub-step before the second sub-step above that includes manipulating the surface map data to compensate for the desired thickness of each of the final body panels.

It is further contemplated that any of the embodiments of the first step of the present invention may be combined with any other of such embodiments to produce a further alternative to forming a rigid mold. For example, an expendable pattern may be produced using stereolithography, which then may be coated with the ceramic slurry layers and fired to form the rigid mold as described above.

The second step of the present invention includes forming die shells in close conforming relation with the positive and negative rigid molds 30*a* and 30*b* using a sheet of material. As illustrated by FIGS. 4 through 7, in the preferred embodiment of the second step of the present invention, a metal sheet 40 is superplastically formed to one of the positive and negative rigid molds 30*a* and 30*b*. Superplastic forming (SPF) is well known and has been used throughout the aerospace industry and other industries to form sheets of titanium, steel, and aluminum. Superplastic forming involves metals that exhibit extraordinarily high tensile elongation at high temperatures under a controlled rate of deformation. Typically the temperatures involved approximate 900° F., and the tensile elongation may range from 300% to 3000%. Such high tensile elongation enables SPF metal sheets to be formed similarly as glass sheet or polymer sheet such as Sheet Molding Compound. The most well known SPF metals are specially developed aluminum alloys and conventional titanium based alloys. For purposes of the dies of the present invention, titanium is the preferred material for its durability characteristics. SPF is able to produce parts with complex shapes since SPF material tends to be resistant to localized necking and rupture. Further, SPF is a superior material for die manufacture since the dies may be produced relatively quickly without need for precision machining, heat treating, or die grinding—as compared to conventional die manufacture.

Figure 4:
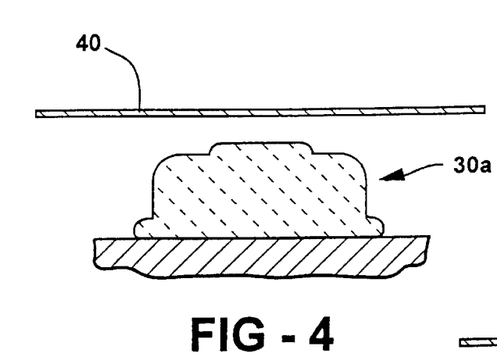
FIG. 4 is a cross-sectional illustration of the step of applying a metal sheet to the surface of the positive rigid mold and represents the second step of the method of the present invention.
Figure 5:
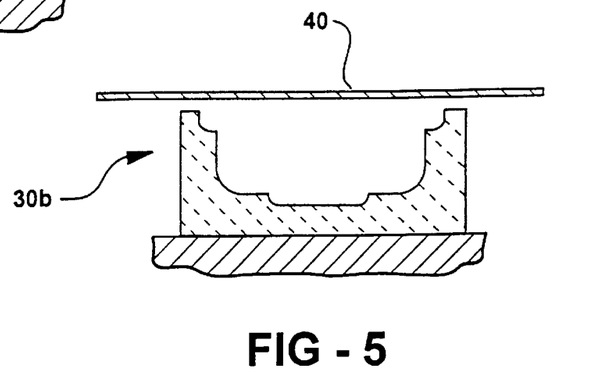
FIG. 5 is a cross-sectional illustration of the step of applying a metal sheet to the surface of the negative rigid mold and represents the second step of the method of the present invention.
Figure 6:
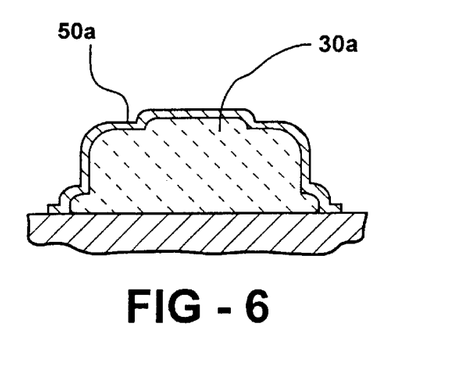
FIG. 6 is a cross-sectional view of the completed step of FIG. 4, showing the metal sheet formed to the surface of the positive rigid mold, thereby defining a negative die shell and representing the second step of the method of the present invention.
Figure 7:
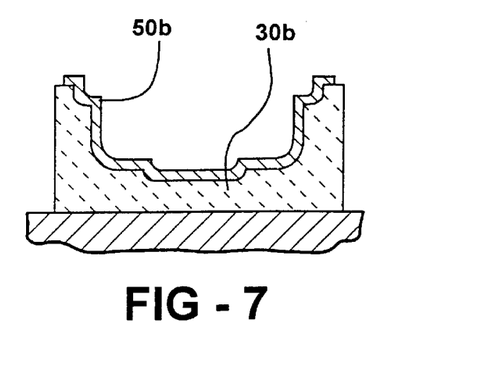
FIG. 7 is a cross-sectional view of the completed step of FIG. 5, showing the metal sheet formed to the surface of the negative rigid mold, thereby defining a positive die shell and representing the second step of the method of the present invention.

Superplastic forming involves superheating the metal sheet 40 to its plastic state and pulling vacuum thereunder to compel the sheet 40 to conform to the positive rigid mold 30*a*. The sheet 40 to be formed is rigidly clamped above the surface of the positive and negative rigid molds 30*a* and 30*b* as schematically depicted in FIGS. 4 and 5. FIGS. 6 and 7 illustrate the result of the SPF process. Here the sheet 40 of FIGS. 4 and 5 has been transformed into negative and positive die shells 50*a* and 50*b* conforming closely to the positive and negative rigid molds 30*a* and 30*b*. The process is very similar to the process of polymer thermoforming. Traditionally, superplastic molds could only be effectively constructed of corrosion resistant steel, since ceramics and other materials had a tendency to fail unpredictably under load. Recently, however, a new method for producing reliable self-supporting ceramic dies was developed as disclosed in U.S. Pat. No. 5,638,724 to Sanders. Thus, the Sanders method contributes to the viability of the present invention. Alternatively, the second step of the present invention may be performed by explosion forming or hydroforming a sheet of material to the rigid mold, as are well known in the art.

Figure 8:
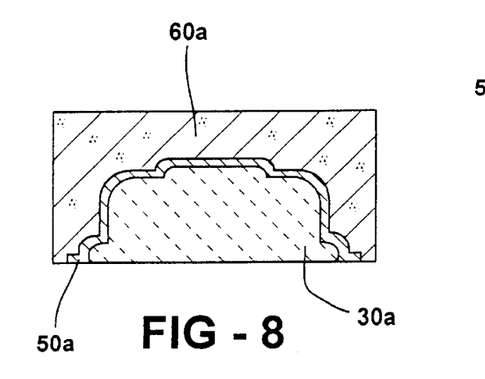
FIG. 8 is a cross-sectional view of the negative die shell mounted to the positive rigid mold and applied to a substrate backing, and represents the third step of the method of the present invention.
Figure 9:
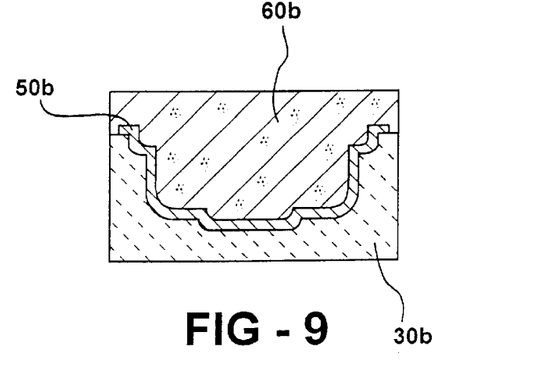
FIG. 9 is a cross-sectional view of the positive die shell mounted to the negative rigid mold and applied to a substrate backing, and represents the third step of the method of the present invention.

The third step of the present invention includes applying a reinforcing substrate to a die shell. Accordingly, FIGS. 8 and 9 illustrate the third step where the negative and positive die shells 50a and 50b have been reinforced with an appropriate substrate 60a and 60b sufficient to incur the repeated heavy forces or temperature variations from stamping, molding, or the like. Preferably, the substrate 60a and 60b is composed of a refractory such as concrete, but depending upon the ultimate use of the dies, may also be composed of cast iron, epoxy, other refractories, or any suitable composite material. For example, if the dies are to be used for injection molding, concrete may be unnecessarily strong, and may be replaced with a suitable composite material. The substrate 60a and 60b thus forms a base on which the die shell 50a and 50b is supported. Alternatively, the die shell 50a and 50b may first be stripped from the positive and negative rigid molds 30a and 30b and subsequently coupled to the reinforcing substrate 60a and 60b. This would involve handling the die shell 50a and 50b in an unsupported state and therefore may detrimentally distort the die shell 50a and 50b, thus compromising the final die quality. Therefore, the preferred embodiment involves applying the reinforcing substrate 60a and 60b to a side of the die shell 50a and 50b opposite that of the rigid mold 30a and 30b—before the die shell 50a and 50b is stripped from the rigid mold 30a and 30b. This will ensure that the die shell 50a and 50b is always rigidly supported.

FIG. 10 illustrates an exploded cross-sectional view of a die setup as could be used with a press or injection molding equipment. Here a negative die 70a is composed of the negative die shell 50a and reinforcing substrate 60a. A positive die 70b is composed of the positive die shell 50b and reinforcing substrate 60b. The negative die 70a is mounted above the positive die 70b for purposes of forming the final body panel 90. The body panel 90 may either be stamped or injection molded between the negative and positive dies 70a and 70b.

In general, air holes may be provided in the rigid mold to enable more accurate forming of the die sheet by pulling vacuum through the holes to conform the sheet to the rigid mold. In addition, the air holes would aid in stripping the die shell from the rigid mold by venting the rigid mold to overcome any seal formed therebetween. Furthermore, each rigid mold may be repeatedly used for multiple die shell manufacture.

From the above, it can be seen that a significant advantage of the present invention is that a series of dies can be mastered from the same ceramic mold. This is especially critical where it is desired to have a series of dies that are as consistent as possible from die to die.

Another advantage is that the method of the present invention results in robust die surfaces that are composed of high strength, high quality metal that is easily and accurately formed in the likeness of the model.

Yet another advantage is that the forming surface on the die is a copy surface that directly descends from a master surface of the model. Likewise, the functional surface of the body panel is a copy surface directly descending from the master surface.

Still another advantage is that the forming surface on the die is only three steps removed from the master surface of the model.

While the present invention has been described in terms of both preferred and alternative embodiments, it is apparent that other forms could be adopted by one skilled in the art. Accordingly, the scope of the present invention is to be limited only by the following claims.

What is claimed is:

1. A method of producing a tool or die from a model, said method comprising the steps of:
   producing a rigid mold from said model;
   forming a die shell of said model from a sheet of material in close conforming relationship over said rigid mold; and
   applying a reinforcing substrate to said die shell on a side of said die shell opposite that of said rigid mold, said applying step being performed while said die shell is still in close conforming relationship with said rigid mold, said applying step thus forming said tool or die from said reinforcing substrate and said die shell.

2. The method as claimed in claim 1, wherein said producing step comprises:
   surface mapping said model to generate surface map data; and
   machining said rigid mold using said surface map data of said surface mapping step.

3. The method as claimed in claim 2, wherein said surface mapping step further includes digitally manipulating said surface map data for thickness compensation.

4. The method as claimed in claim 2, wherein said surface mapping step is performed using CNC probing technology.

5. The method as claimed in claim 2, wherein said surface mapping step is performed using a digital data set from a CAD model.

6. The method as claimed in claim 2, wherein said machining step is performed on said rigid mold, and said rigid mold comprises a ceramic material.

7. The method as claimed in claim 1, wherein said forming step further comprises the step of superplastically forming said sheet of material over said rigid mold.

8. The method as claimed in claim 7, wherein said sheet of material comprises a titanium alloy.

9. The method as claimed in claim 1, wherein said forming step comprises the step of explosion forming said sheet of material over said rigid mold.

10. The method as claimed in claim 1, wherein said forming step comprises the step of hydro-forming said sheet of material over said rigid mold.

11. The method as claimed in claim 1, further comprising the step of stripping said tool or die from said rigid mold.

12. A method of producing a matching die set from a model to produce a series of parts, said method comprising the steps of:
   producing a positive and negative rigid mold from said model;
   forming a negative and positive die shell, said forming step including forming said negative die shell from a sheet of material in close conforming relationship with said positive rigid mold, said forming step further including forming said positive die shell from another sheet of material in close conforming relationship with said negative rigid mold; and applying a negative and positive reinforcing substrate to said negative and positive die shell respectively, said applying step including applying said negative substrate to said negative die shell on a side of said negative die shell opposite that of said positive rigid mold, said applying step being performed while said negative die shell is in close conforming relationship with said positive rigid mold, said applying step forming a negative die from said negative reinforcing substrate and said negative die shell, said applying step further including applying said positive reinforcing substrate to said positive die shell on a side of said positive die shell opposite that of said negative rigid mold, said applying step being performed while said positive die shell is in close conforming relationship with said negative rigid mold, said applying step forming a positive die from said positive reinforcing substrate and said positive die shell, said positive and negative die forming said matching die set.

13. The method as claimed in claim 12, wherein said producing step comprises:

casting a solidifying material over said model to form a negative mold;

filling said negative mold with a hardenable material to form said positive rigid mold;

machining a layer off said model; and casting a hardenable material over a model to form said negative rigid mold.

14. The method as claimed in claim 12, wherein said producing step comprises:

surface mapping said model to generate surface map data;

manipulating said surface map data to compensate for the thickness of each part of said series of parts, thereby resulting in manipulated surface map data.

15. The method as claimed in claim 14, wherein said producing step further comprises:

making a positive pattern using said surface map data;

casting a solidifying material over said positive pattern to form a negative mold;

introducing a hardenable material into said negative mold to form said positive rigid mold;

making a negative pattern using said manipulated surface map data;

casting a solidifying material into said negative pattern to form a positive mold; and pouring a hardenable material over said positive mold to form said negative rigid mold.

16. The method as claimed in claim 14, wherein said producing step comprises:

making a negative expendable pattern from said surface map data;

coating said negative expendable pattern with a series of ceramic slurry layers to form a positive ceramic shell;

firing said negative expendable pattern and said positive ceramic shell to cure said positive ceramic shell and vaporize said negative expendable pattern to form said positive rigid mold;

making a positive expendable pattern using said manipulated surface map data;

coating said positive expendable pattern with a series of ceramic slurry layers to form a negative ceramic shell; and firing said positive expendable pattern and said negative ceramic shell to cure said negative ceramic shell and vaporize said positive expendable pattern to produce said negative rigid mold.

17. The method as claimed in claim 14, wherein said producing step comprises:

generating by stereolithography a negative prototype mold using said surface map data;

introducing a hardenable material to said negative protoype mold to form said positive rigid mold;

generating by stereolithography a positive prototype mold using said manipulated surface map data; and introducing a hardenable material to said positive prototype mold to form said negative rigid mold.

18. The method as claimed in claim 14, wherein said producing step comprises:

making an expendable positive pattern using said surface map data;

lost-material casting said positive rigid mold from said expendable positive pattern;

making an expendable negative pattern using said manipulated surface map data; and lost-material casting said negative rigid mold from said expendable negative pattern.

19. The method as claimed in claim 12, wherein said forming step comprises the step of superplastically forming said sheet of material to said positive and negative rigid molds.

20. The method as claimed in claim 19, wherein said sheet of material is composed of a titanium alloy.

21. The method as claimed in claim 12, further comprising:

stripping said positive and negative die shells from said positive and negative rigid molds.

22. A tool or die made by the method as claimed in claim 12.

23. A method of producing a negative die from a model to produce a series of parts, said method comprising the steps of:

producing a positive rigid mold from said model without using a compensating layer of material;

forming a negative die shell of said model from a sheet of material in close conforming relationship over said positive rigid mold; and applying a reinforcing substrate to said negative die shell on a side of said negative die shell opposite that of said positive rigid mold, said applying step being performed while said negative die shell is still in close conforming relationship with said positive rigid mold, said applying step thus forming said negative die from said reinforcing substrate and said negative die shell.

24. The method as claimed in claim 23, wherein said producing step comprises:

casting a solidifying material over said model to form a negative mold; and filling said negative mold with a hardenable material to form said positive rigid mold.

25. The method as claimed in claim 23, wherein said producing step comprises:

surface mapping said model to generate surface map data; and manipulating said surface map data to compensate for the thickness of each part of said series of parts, thereby resulting in manipulated surface map data.

26. The method as claimed in claim 25, wherein said surface mapping step further includes digitally manipulating said surface map data for thickness compensation.

27. The method as claimed in claim 25, wherein said producing step further comprises:
  making a positive pattern using said surface map data;
  casting a solidifying material over said positive pattern to form a negative mold; and
  introducing a hardenable material into said negative mold to form said positive rigid mold.

28. The method as claimed in claim 25, wherein said producing step comprises:
  making a negative expendable pattern from said surface map data;
  coating said negative expendable pattern with a series of ceramic slurry layers to form a positive ceramic shell; and
  firing said negative expendable pattern and said positive ceramic shell to cure said positive ceramic shell and vaporize said negative expendable pattern to form said positive rigid mold.

29. The method as claimed in claim 25, wherein said producing step comprises:
  generating by stereolithography a negative prototype mold using said surface map data; and
  introducing a hardenable material to said negative prototype mold to form said positive rigid mold.

30. The method as claimed in claim 25, wherein said producing step comprises:
  making an expendable positive pattern using said surface map data; and
  lost-material casting said positive rigid mold from said expendable positive pattern.

31. The method as claimed in claim 23, wherein said forming step comprises the step of superplastically forming said sheet of material to said positive rigid mold.

32. The method as claimed in claim 23, wherein said forming step comprises the step of explosion forming said sheet of material to said positive rigid mold.

33. The method as claimed in claim 23, wherein said forming step comprises the step of hydroforming said sheet of material to said positive rigid mold.

34. A method of producing a positive die from a model, said method comprising the steps of:
  producing a negative rigid mold from said model without using a compensating layer of material;
  forming a positive die shell of said model from a sheet of material in close conforming relationship over said negative rigid mold; and
  applying a reinforcing substrate to said positive die shell on a side of said positive die shell opposite that of said negative rigid mold, said applying step being performed while said positive die shell is still in close conforming relationship with said negative rigid mold, said applying step thus forming said positive die from said reinforcing substrate and said positive die shell.

35. The method as claimed in claim 34, wherein said producing step comprises:
  machining a layer off said model; and
  casting a hardenable material over said model to form said negative rigid mold.

36. The method as claimed in claim 34, wherein said producing step comprises:
  surface mapping said model to generate surface map data; and
  manipulating said surface map data to compensate for the thickness of each part of said series of parts, thereby resulting in manipulated surface map data.

37. The method as claimed in claim 36, wherein said surface mapping step further includes digitally manipulating said surface map data for thickness compensation.

38. The method as claimed in claim 36, wherein said producing step further comprises:
  making a negative pattern using said surface map data;
  casting a solidifying material into said negative pattern to form a positive mold; and
  introducing a hardenable material over said positive mold to form said negative rigid mold.

39. The method as claimed in claim 36, wherein said producing step comprises:
  making a positive expendable pattern from said surface map data;
  coating said positive expendable pattern with a series of ceramic slurry layers to form a negative ceramic shell; and
  firing said positive expendable pattern and said negative ceramic shell to cure said negative ceramic shell and vaporize said positive expendable pattern to form said negative rigid mold.

40. The method as claimed in claim 36, wherein said producing step comprises:
  generating by stereolithography a positive prototype mold using said manipulated surface map data; and
  introducing a hardenable material to said positive prototype mold to form said negative rigid mold.

41. The method as claimed in claim 36, wherein said producing step comprises:
  making an expendable negative pattern using said manipulated surface map data; and
  lost-material casting said negative rigid mold from said expendable negative pattern.

42. The method as claimed in claim 34, wherein said forming step comprises the step of superplastically forming said sheet of material to said negative rigid mold.

43. The method as claimed in claim 34, wherein said forming step comprises the step of explosion forming said sheet of material to said negative rigid mold.

44. The method as claimed in claim 34, wherein said forming step comprises the step of hydroforming said sheet of material to said negative rigid mold.

* * * * *

UNITED STATES PATENT AND TRADEMARK OFFICE
CERTIFICATE OF CORRECTION

PATENT NO. : 6,279,425 B1
DATED : August 28, 2001
INVENTOR(S) : Cicotte

It is certified that error appears in the above-identified patent and that said Letters Patent is hereby corrected as shown below:

Column 4,
Line 2, after "positive pattern" delete second occurrence "pattern".

Column 6,
Line 42, after "F" delete the period ".".

Column 8,
Line 27, delete "producing step comprises:" and insert -- producing step further comprises the steps of: --.

Column 9,
Lines 21, 31, 37 and 51, delete "producing step comprises:" and insert -- producing step further comprises the steps of: --.
Line 27, delete "a" and insert -- said --.

Column 10,
Lines 4, 15, 53 and 59, delete "producing step comprises:" and insert -- producing step further comprises the steps of: --.
Line 31, after "comprising" insert -- the steps of --.

Column 11,
Line 2, delete "producing step further comprises:" and insert -- producing step further comprises the steps of: --.
Lines 10, 21, 27 and 57, delete "producing step comprises:" and insert -- producing step further comprises the steps of: --.

UNITED STATES PATENT AND TRADEMARK OFFICE
CERTIFICATE OF CORRECTION

PATENT NO.    : 6,279,425 B1
DATED         : August 28, 2001
INVENTOR(S)   : Cicotte It is certified that error appears in the above-identified patent and that said Letters Patent is hereby corrected as shown below:

Column 12,
Lines 5, 24, 36 and 42, delete "producing step comprises:" and insert -- producing step further comprises the steps of: --.
Line 16, delete "producing step further comprises:" and insert -- producing step further comprises the steps of: --.

Signed and Sealed this

Eighteenth Day of March, 2003

JAMES E. ROGAN
*Director of the United States Patent and Trademark Office*